Feb. 11, 1958 F. W. SAMPSEL 2,822,617
LEVEL
Filed Feb. 14, 1955
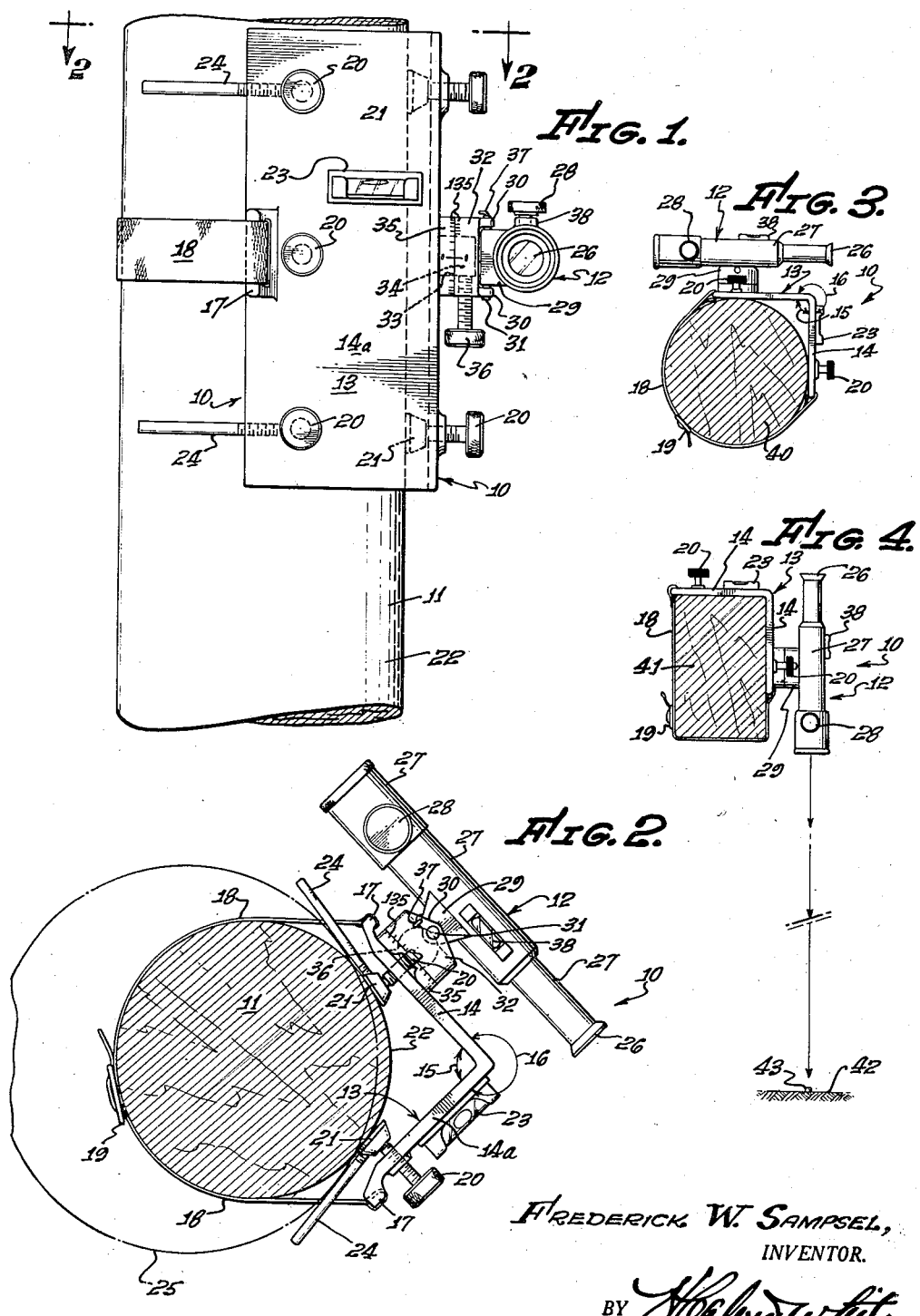
FREDERICK W. SAMPSEL,
INVENTOR.
BY
ATTORNEY.

United States Patent Office 2,822,617
Patented Feb. 11, 1958

2,822,617
LEVEL
Frederick W. Sampsel, El Monte, Calif.
Application February 14, 1955, Serial No. 488,085
11 Claims. (Cl. 33—70)

This invention relates to portable surveying instruments of the type in which a telescope is mounted to establish a line of sight for measurement purposes, and more particularly has to do with an improved leveling instrument, also capable of use as a transit, characterized by features enabling the instrument to be removably fastened against the surface of a stationary object such as a structural column, tree trunk, post or the like in the field for surveying purposes, to the end that no tripod or other type of bulky support is required to support the instrument during its use.

Various types of surveying instruments in common use at the present time, such as levels, transits and plane tables, all require a form of tripod for their support in field use in order that the instrument may be conveniently leveled with respect to absolute horizontal, and also that the eye piece of the instrument may be positioned at a suitably elevated distance from the ground for use by the surveyor. For these reasons, the necessity of the tripod to the use of surveying instruments has been generally unquestioned, and accordingly surveyors are burdened with tripods wherever surveying is necessary. It is recognized, however, that where surveying must be carried out in difficult or remote areas, such as in wooded or mountainous terrain, the difficulties of transporting complete surveying equipment, including large size tripods, are considerably increased, and as a result surveying operations in such locations are often times slowed or otherwise hampered, and the desirability of a more portable less bulky instrument capable of the same use becomes increasingly evident.

In accordance with the present invention, provision is made for an improved portable surveying instrument characterized by features enabling the instrument to be readily fastened to objects in the field at a convenient level above the ground for suitably effective use, as in leveling, transit work or the like. The instrument includes a telescope of the usual type for establishing a line of sight, a support mounting the telescope in position for sighting purposes, a flexible member such as a strap or belt carried by the support for connecting the instrument assembly around a tree trunk, post or other field object, and several adjustable members carried by the support for engagement with the surface of the object around which the assembly is fastened. These latter members typically comprise thumb screws having pressure pads engageable with the surface of the object, the screws being individually adjustable for varying the position of the telescope and the support relative to the field object around which the assembly is fastened to establish a desired alignment of the telescope for sighting purposes. It is also contemplated that the adjustment members may be otherwise arranged between the support and the telescope for adjusting the position of the telescope relative to the support, the latter being directly engageable against the field object in fastened condition.

Another purpose of the invention is to provide a surveying instrument capable of use either as a level or a transit, there being a pivot connection between the telescope and the support with a vernier calibration therebetween for indicating the degree of relative pivoting of the telescope about a first axis, and also a thumb screw interconnected with the pivot connection for tightening the connection against rotation of the telescope at a desired angle. Means are also provided for mounting the telescope to pivot about a second axis extending at right angles to the first axis, the second axis normally extending vertically when the assembly is fastened to an object in the field, so that the telescope may be swung in a horizontal plane for leveling purposes.

Other objects and features of the invention include the provision of an angled support bracket accommodating extension of the supporting portion of the instrument assembly around a portion of the surface of a tree trunk or the like, and the use of three adjustable thumb screws providing adjustable three-point support for the assembly against the field object. In addition, leveling bubbles are suitably mounted on the support bracket and on the telescope to enable the position of the assembly to be altered relative to the field object by means of the adjustable thumb screws to attain a leveled condition prior to use of the instrument. When the assembly is fastened around a substantially horizontal rail, or the like, the telescope may be swung into a vertically extended position for sighting downwardly, simulating a plumb line, and serving a similar purpose to establish the location of a point on the surface of the earth from which a horizontal line may be run, as is common practice in surveying work.

Additional features of the invention, as well as the details of an illustrative embodiment thereof, will be more fully understood from the following detailed description of the accompanying drawing, in which:

Fig. 1 is an elevation illustrating the fastened condition of the surveying assembly on a tree trunk or post;

Fig. 2 is a plane view, partly in section, of the surveying apparatus shown in Fig. 1 and taken on line 2—2 thereof;

Fig. 3 is an elevation illustrating the fastened condition of the portable surveying instrument on a horizontal member shown in section; and Fig. 4 is another elevation illustrating the mounting of the instrument assembly on a horizontal rail and the use of the instrument as a plumb bob.

Referring to Figs. 1 and 2 the surveying instrument assembly 10 is shown to be fastened to an upright object 11 such as a tree trunk, or post or the like, the assembly including a telescope 12 mounted on a supporting bracket 13. The latter has two legs 14 extending at approximately right angles, and forming interior angle 15 and exterior angle 16, the telescope being mounted on one of the legs and on the exterior side thereof.

Permanently connected to lugs 17 projecting from legs 14 are a pair of straps or belts 18 carrying buckles 19 for connecting the belts around the exterior surface of the shaft-like object 11 in a tightened condition. The bracket legs 14 threadedly mount five thumb screws 20 having pressure pads 21 connected at their inner ends for engagement with the surface 22 of the object facing the bracket legs. When the belts 18 are tightened around the object 13, the bracket legs 14 extend in angled relation part way around the object so that the pressure pads engage the object surface 22 at spaced locations, giving a multiple support to the surveying instrument for purposes to be brought out. As shown in Fig. 1, two of the thumb screws 20 are preferably threadedly connected through the bracket leg 14, to which the telescope is mounted, while the three remaining thumb screws are connected to the other bracket leg 14a symmetrically with respect to the first two screws, that is, at a distance from the apex of the bracket equal to the distance therefrom to a line between the first two screws. Screws 20 on each bracket leg are positioned in vertically spaced relation as shown in Figs. 1 and 2.

The bracket leg 14a to which the three screws are connected also mounts a bubble tube 23 adapted to indicate a leveled condition of that bracket leg or of both legs 14 if a double bubble is used. Fig. 2 also illustrates the use of rod-like extensions 24 threadedly interconnectible with the pressure pads 21 carried at the ends of the upper and lower thumb screws 20 on both legs 14 to provide for fastening the instrument assembly around larger sized objects 25. The pads 21 are preferably either non-pivoting or pivotal only to a limited extent as shown in Fig. 2 to give support to extensions 24 when the latter are utilized.

The telescope 12 includes an eye-piece 26 at one end thereof, telescoping shank sections 27, and an adjustment 28 for shifting the position of one or more of the shank sections for focusing purposes. The intermediate shank section 27 is rigidly supported by a boss 29 extending sidewardly therefrom and hinged between ears 30 by a pin 31. Ears 30 are formed on a swivel member 32 containing a bore 33 in which is received shaft 34 extending toward the telescope from shank 35 connected to bracket leg 14. The outer diameters of shank 35 and swivel member 32 are co-extensive, and a vernier 135 is formed on adjacent surface portions thereof to indicate the angle at which swivel member 32 is pivoted relative to shank 35. Swiveling of member 32 rotates the telescope about the axis of shaft 34, and such rotation may be arrested by a set screw 36 extending through the side of swivel member 32 in threaded engagement therewith and adapted to be tightened against shaft 34.

Rotation of the telescope about the axis of pin 31, extending at right angles to the axis of shaft 34, is accommodated by the hinge connection described above, and such rotation may be suitably prevented by the insertion of a pin 37 through suitable holes formed in one ear 30 and boss 29.

Upon fastening of the instrument assembly to the upright object 11, it will be found that the V-shaped bracket 13 and upper and lower thumb screws 20 support the telescope in approximate position for leveling or transit work, a fine adjustment then being obtainable by rotating the upper and lower thumb screws 20 to level bubble tube 23 and an additional bubble tube 38 carried on the telescope. The center screw 20 on leg 14a is not utilized, as the upper and lower screws give adequate support. The instrument may be used as a level in the usual manner, withdrawal of pin 37 facilitating rotation of the telescope in a horizontal plane to establish a desired line of sight. If it is desired to run vertical angles, set screw 36 may be loosened and telescope 12 rotated in a vertical plane, suitable vernier readings being taken before and after telescope rotation, all within the normal procedure prescribed for transit use. The instrument assembly is readily removable for transportation by loosening the belts 18 to remove the assembly from the object 11, and tightening set screw 36 and inserting pin 37 to prevent inadvertent rotation of the telescope during movement.

Use of the surveying instrument assembly in the position shown in Fig. 3 is equally and readily accommodated by fastening it around a substantially horizontally extending object, such as a fence rail 40. In this position, the four thumb screws 20 previously utilized may be adjusted to permit leveling the telescope in a horizontal plane, with the axis of shaft 34 extending vertically and the axis of pin 31 extending horizontally. Accordingly, the instrument is then useable as a level in the normal manner, and also as a transit for obtaining azimuth angles with the aid of the vernier 135.

The instrument may also be mounted in the position shown in Fig. 4, wherein the L-shaped bracket 13 is clamped or fastened against the right angled side of a timber 41, with the telescope adjusted to extend exactly vertically for establishing a vertical line of sight directed toward the ground 42. Vertical alignment of the telescope in a first perpendicular plane is made by loosening set screw 36 and removing pin 37 to allow the telescope to hang freely, with its center of gravity below the horizontal axis of rotation. Vertical alignment of the telescope in the second perpendicular plane is accommodated by use of the central thumb screw 20 alone in leg 14a to level the bubble in tube 23. Under these conditions, a surveyor may sight through the eyepiece 26 and establish a point 43 on the ground, such as would be found by use of a plumb bob, and from which a ground line may be run in the course of surveying.

The present invention broadly contemplates that the thumb screws 20 be engageable with the bracket 13 in such a way as to permit adjusting the alignment of telescope 12; and therefore, the thumb screws may or may not be engageable with the surface 22 of the object 11, depending on whether or not their adjusting function is obtained by their engagement with that surface 22 or with other structure supporting the telescope.

I claim:

1. Portable sighting apparatus removably attachable to differently shaped bodies for sighting purposes, comprising a telescope, an assembly including a V-shaped base, means mounting the telescope at the exterior angle side of the base, a pair of elongated supports spaced from the telescope and engageable with a selected body at the interior angle side of said base and means including universally swingable joints connecting the supports with said base for independent relative swinging movement of the supports to directly engage and variably conform with the shape of the body, said supports extending relatively away from one another, and other means carried by the assembly and removably connectable with said body to hold the supports thereagainst whereby the assembly may be firmly attached to the body for mounting the telescope in spaced sighting position relative thereto.

2. Portable sighting apparatus removably attachable to differently shaped bodies for sighting purposes, comprising a telescope, an assembly including a V-shaped base, means mounting the telescope at the exterior angle side of the base, a pair of elongated supports spaced from the telescope and engageable with a selected body at the interior angle side of said base and means including universally swingable joints connecting the supports with said base for independent relative swinging movement of the supports to directly engage and variably conform with the shape of the body, said supports extending relatively away from one another, and flexible means carried by the assembly and removably connectable around said body to hold the supports thereagainst whereby the assembly may be firmly attached to the body for mounting the telescope in spaced sighting position relative thereto.

3. Portable sighting apparatus removably attachable to differently shaped bodies for sighting purposes, comprising a telescope, an assembly including a V-shaped base, means mounting the telescope at the exterior angle side of the base, a pair of elongated supports spaced from the telescope and engageable with a selected body at the interior angle side of said base and means including universally swingable joints connecting the supports with said base for limited independent relative swinging movement of the supports to directly engage and variably conform with the shape of said body, said supports extending relatively away from one another, and a flexible member carried by said mounting means and forming therewith a loop extensible around and removably connectable to said body to hold the supports thereagainst whereby the assembly may be firmly attached to the body for mounting the telescope in spaced sighting position relative thereto.

4. The invention as defined in claim 3 in which said means connecting the supports with said base includes adjustable fasteners in engagement with said base, said fasteners accommodating displacement of said base relative to said body while attached thereto.

5. The invention as defined in claim 4 in which said fasteners comprise a pair of screws respectively interconnected with the base legs and pivotal joints at the interior angled side of the base.

6. The invention as defined in claim 5 in which said mounting means includes a pivotal connection mounting the telescope for rotation in a first plane relative to the base and a vernier for indicating the amount of said rotation.

7. The invention as defined in claim 6 including another pivotal connection mounting the telescope for rotation in a second plane normal to the first plane and relative to the base.

8. The invention as defined in claim 6 including leveling bubbles carried by the telescope and base.

9. The invention as defined in claim 5 in which said member comprises a strap connected with the base.

10. Portable sighting apparatus removably attachable to differently shaped bodies for sighting purposes, comprising a telescope, an assembly including means mounting the telescope at one side thereof, a pair of spaced elongated supports extending relatively away from one another for engagement with a relatively large size body, said mounting means including a V-shaped base and a pair of screws respectively threadedly interconnected with the base legs, said assembly including pivotal joints connecting the supports with said screws at the interior angled side of the base for limited independent relative swinging movement of the supports to directly engage and variably conform with the shape of said body, and a flexible member carried by said mounting means and forming therewith a loop extensible around and removably connectable to said body to hold the supports thereagainst whereby the assembly may be firmly attached to the body for mounting the telescope in spaced sighting position relative thereto.

11. The invention as defined in claim 10 in which said joints are universally swingable.

References Cited in the file of this patent

UNITED STATES PATENTS

| | | |
|---|---|---|
| 18,728 | Becker | Dec. 1, 1857 |
| 434,399 | Paoli | Aug. 12, 1890 |
| 478,309 | Burchinal | July 5, 1892 |
| 1,239,083 | Clark | Sept. 4, 1917 |
| 1,401,146 | Falconer | Dec. 27, 1921 |
| 2,117,522 | Straatman | May 17, 1938 |
| 2,549,244 | Schuett | Apr. 17, 1951 |